United States Patent [19]

Doveri

[11] Patent Number: 4,521,208
[45] Date of Patent: Jun. 4, 1985

[54] TENSION-ADJUSTING DEVICE FOR TOOTHED DRIVING BELTS SUBJECTED TO WIDE TEMPERATURE DIFFERENTIALS

[75] Inventor: Carlo Doveri, Pontedera, Italy

[73] Assignee: Piaggio & C. S.p.A., Genova, Italy

[21] Appl. No.: 400,087

[22] Filed: Jul. 20, 1982

[30] Foreign Application Priority Data

Jul. 23, 1981 [IT] Italy ................................ 23094 A/81

[51] Int. Cl.³ ............................................. F16H 7/08
[52] U.S. Cl. .................................. 474/101; 123/90.19;
123/90.31; 474/133
[58] Field of Search ............... 474/101, 133, 135, 134, 474/136, 137, 138; 123/90.19, 90.31

[56] References Cited

U.S. PATENT DOCUMENTS 2,631,576  3/1953  Schowalter ...................... 123/90.19
3,034,488  5/1962  Reiners ....................... 123/90.19 X
3,707,092 12/1972  Piech ................................... 474/101

Primary Examiner—Lawrence J. Staab
Assistant Examiner—Dwight G. Diehl
Attorney, Agent, or Firm—Cushman, Darby & Cushman

[57] ABSTRACT

A tension-adjusting assembly for driving belts, such as driving belts for controlling the timing shaft of internal combustion engines, includes a device for neutralizing the effects of the variations of the distance between the axes of the pulleys, as caused by thermal expansions of the supports for the pulley journals.

6 Claims, 2 Drawing Figures

TENSION-ADJUSTING DEVICE FOR TOOTHED DRIVING BELTS SUBJECTED TO WIDE TEMPERATURE DIFFERENTIALS

This invention relates to the problem of the tension increase of driving belts in general, as caused by the expansion of the supporting members of the transmission mechanisms due to the effect of a temperature increase and, more particularly, it relates to the pull increase which is experienced in the toothed belts for controlling the timing in internal combustion engines.

In this case, the temperature differential between the environmental temperature experienced on assembly and that which obtains as the engine is running, may even attain values in the order of 100° C. in the pulley journals, especially if the engine is of the air-cooled type.

In the case of engines having the engine block and the engine head made of an aluminium alloy, the extension of the distance between the sheave axes corresponding to such an increase of the temperature would be in the order of magnitude of 2.5 per thousand so that the ensuing increase of the belt pull would attain values which are in disagreement with a reasonable service life of the belt concerned if the initial preloading tension is adjusted in cold engine conditions by blocking the appropriate tensioning idler in a suitable position.

To prevent such a drawback, resiliently yieldable idlers are sometimes adopted which, however, due to the pulsations of both the driving torque and the power absorbed by the camshaft in the timing assembly may originate vibrations which are detrimental to a satisfactory operation of the timing assembly and which, at any rate, are noisy.

An object of the present invention is to provide a particular automatic device for adjusting the tension in the belt in order to act upon the position of the belt-tightening idler so that, as the temperature is increased, the pull increase and the possibility that too wide oscillations may take place are suppressed or anyhow considerably reduced.

Another object of the present invention is to provide a belt-tension adjusting device having a comparatively simple and compact structure so as to be susceptible of being easily mounted on an internal combustion engine, wherein it finds an elective application, while concurrently exhibiting a high reliability and convenience of assemblage.

This object and others to be more clearly ascertainable from the ensuing disclosure, are achieved, according to the invention, by providing a device for adjusting the pull of a driving belt, more particularly a crenellated belt controlling the timing shaft in an internal combustion engine, which is held taut between two sheaves supported by a supporting member exposed to thermal expansion, comprising a tensioning idler mounted on a movable component part of the supporting member to act upon a belt lap, characterized in that said movable member is equipped with an abutment for holding the idler pressed against the belt lap concerned, and in that means are provided which are responsive to the temperature of said supporting member and act in the sense of shifting said abutment by a length of stroke corresponding to the variation of the sag of said belt lap as originated by the thermal expansion of said supporting member.

An embodiment which reduces to constructive practice the device according to the invention is diagrammatically shown by way of example in the accompanying drawings, wherein.

Figure 1:
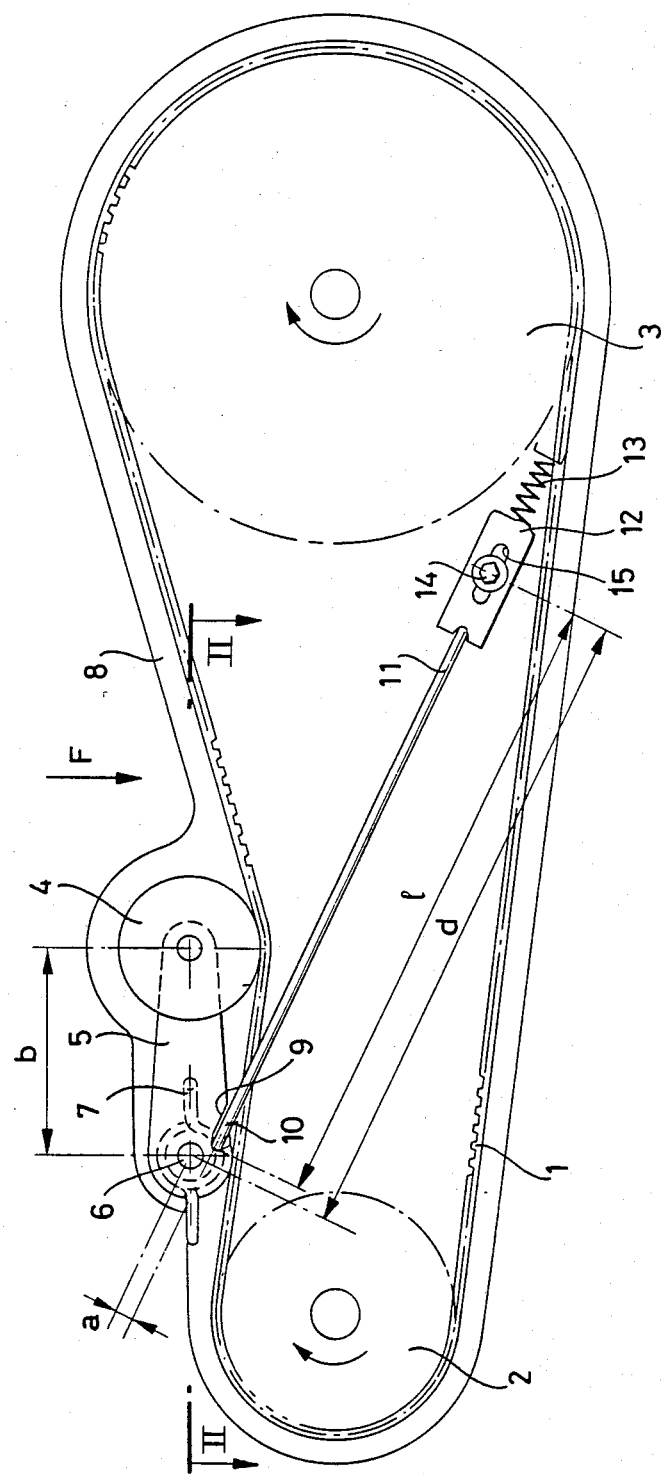
FIG. 1 is a diagrammatical side elevational view of a wall on which a driving assembly is mounted, which is equipped with an adjustment device according to this invention.
Figure 2:
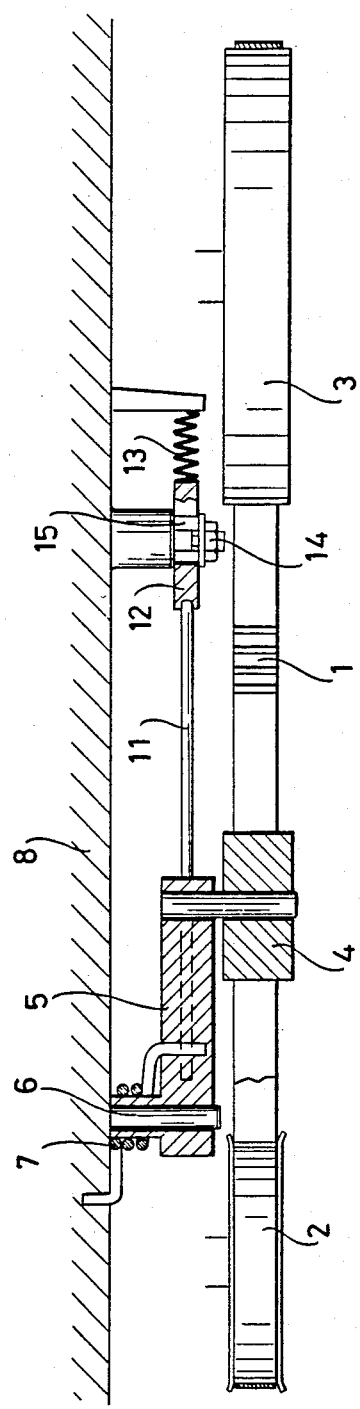
FIG. 2 is a partial cross-sectional view taken in the direction of the arrow F along the line II—II of FIG. 1.

As can be seen, the belt 1, of the toothed type, runs on the sheaves 2 and 3, which are the driving and the driven pulley respectively and is urged in correspondence with its slacking lap by an idler 4, placed at the end of an arm 5 rotatable about a pin 6 but thrust against the belt 1 by a spring, 7, secured to the supporting member 8 for said sheaves 2 and 3. The arm 5 has a recess 9 into which insists the end 10 of a clearance takeup rod 11, the opposite end of which rests against a member 12 properly secured to the supporting member 8 and can swing with respect thereto. More particularly, between the member 12 and the supporting member 8 a spring 13 is inserted, having the task of taking up any clearance existing between the rod 11 and its resting surfaces, but the member 12 can be locked to the supporting member 8 by a screw 14 passed through a specially provided slot 15. This locking engagement holds the rod pointing against the idler 4, so as to prevent the latter from being set apart from the belt 1, against which it is biassed by the spring 7 so as to impress the appropriate preloading tension thereto.

During assembly, the spring 7 is entrusted with the function of pressing the idler against the belt so as to impart an appropriate preliminary tension thereto. Loosening the screw 14 enables member 12 to thrust the rod 11 on its end supporting members so that any clearance is taken up. Thereafter, the screw can be tightened again.

As the temperature of the supporting member 8 is increased so that the supporting member expands, the distance between the axes of the two sheaves 2 and 3 is increased and the slackening lap of the belt tends to become tightened and the idler 4 is consequently pushed outwards. Such a movement is possible against the bias of the spring 7, since the arm 5 can be rotated about the pin 6 through an angle corresponding to the difference of the variation of the distance d between the pin 6 and the locking screw 14 due to the effect of the temperature increase of the supporting member 8 and the simultaneous variation of the length, 1, of the rod 11. Said difference can exist both because the temperature increase of the rod 11 is less than that of the supporting member 8 since the rod 11 is distant from the supporting member 8, and because the rod 11 is made of a material having a coefficient of thermal expansion less than that of the supporting member 8. This is especially true if, for example, the rod 11 is made of steel and the supporting member 8 is made of an aluminium alloy. The displacement of the idler 4 is equivalent to said difference between the variation d, and the variation of and the length l of the rod 11, multiplied by the ratio of the length of the arm b to the distance a between the axis of the rod 11 and the axis of the pin 6. By acting upon the value of the arm ratio aforesaid as well as upon the length and the material selected for the rod 11, it is possible to obtain that the displacement of the idler 4 is equal to that which would take place if the connection with the rod 11 should not exist, that is to say that the idler is allowed to be shifted through the length which is required by the tightening of the belt due to the sheaves being pushed apart from one another and without having the displacement hindered by the presence of the rod 11. Consequently the pull of the belt is increased only by the small amount corresponding to the tension increase of the spring 13 due to the displacement of the idler 4. On the contrary, if the rod 11 had an expansion corresponding to that of the supporting member 8, the increase of the belt pull would have been equal to that which would have been experienced in the case of the idler being blocked in position, because, in such a case, the geometry of the system would not have changed.

The advantage of the system relative to the arrangement with a loaded idler (spring biassed) but without the connection consisting of the rod 11 lies in that the production of oscillations of the idler is prevented, which could be originated by the pulsatory variations of the transferred torque or any other reasons, because the rod 11, thrusting into the seat 9, prevents the arm 5 from being swung in such a direction as to displace the idler 4 away of the belt.

It is understood that the accompanying drawings show only a diagrammatical embodiment of the invention since different constructional arrangements can be found. For example, the idler could be guided prismatically, the rod of compensation 11 could be hingedly mounted at its end in both directions and the system of backlash takeup could be differently inserted in the compensation rod and otherwise, without therefor departing from the scope of the invention for the subject adjustment device as disclosed in the present specification.

I claim:

1. A device for adjusting the pull of a driving belt, more particularly a toothed belt controlling a timing shaft in an internal combustion engine, running on at least two sheaves borne by a supporting member exposed to thermal expansion, comprising a tensioning idler mounted on a movable member on the supporting member for acting in one direction upon the belt, there being provided urging means for preventing movement of said movable member in a direction opposite to said one direction, said preventing means being thermally expansible in response to the temperature of said supporting member in order to allow displacement of the movable member by an extent substantially corresponding to the variation of the sag of the belt as originated by the thermal expansion of the supporting member.

2. A device according to claim 1, characterized in that said movable member is subjected to a spring bias to be moved to urge the idler against the belt lap to impress a preselected tension thereto.

3. A device according to claim 1, characterized in that said thermally expansible preventing means includes a rod subjected to a temperature as a function of the temperature of the supporting member, said rod being secured at one end to said supporting member and at the other end acting like an abutment for said movable member.

4. A device according to claim 3, characterized in that said movable member is an arm pivoted to said supporting member and carrying at its free end an idler resting against said belt.

5. A device according to claim 4, characterized in that said rod is housed with the other end in a recess formed through said arm.

6. A device according to claim 5, characterized in that said rod has said one end hinged to a slidable member resiliently urged in the direction of said rod and susceptible of being fixedly secured to said supporting member.

* * * * *